US010230446B2

(12) United States Patent
Sun et al.

(10) Patent No.: US 10,230,446 B2
(45) Date of Patent: Mar. 12, 2019

(54) METHOD AND APPARATUS FOR TRANSMITTING DIVERSITY

(71) Applicant: Samsung Electronics Co., Ltd, Gyeonggi-do (KR)

(72) Inventors: Pengfei Sun, Beijing (CN); Chen Qian, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/243,942

(22) Filed: Aug. 22, 2016

(65) Prior Publication Data
US 2017/0085308 A1 Mar. 23, 2017

(30) Foreign Application Priority Data

Aug. 21, 2015 (CN) .......................... 2015 1 0518648
Jan. 25, 2016 (CN) .......................... 2016 1 0048551

(51) Int. Cl.
*H04B 7/06* (2006.01)
*H04B 7/04* (2017.01)

(52) U.S. Cl.
CPC ........... *H04B 7/0669* (2013.01); *H04B 7/068* (2013.01); *H04B 7/0691* (2013.01)

(58) Field of Classification Search
CPC .. H04B 7/0617; H04B 7/0408; H04B 7/0413; H04B 7/0689; H04L 5/0023
See application file for complete search history.

(56) References Cited

U.S. PATENT DOCUMENTS 6,201,499 B1 * 3/2001 Hawkes ................. G01S 1/045
342/387
2010/0104036 A1 4/2010 Liao et al.
(Continued)

OTHER PUBLICATIONS

The International Searching Authority, "International Search Report," International Application No. PCT/KR2016/009186, dated Nov. 22, 2016, 3 pages, publisher the ISA/KR, International Application Division, Korean Intellectual Property Office, Daejeon, Republic of Korea.
(Continued)

*Primary Examiner* — David S Huang (57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

According to a method for transmitting diversity, implemented at a transmitting end, space-time precoding is performed for a digital signal to obtain at least two coded signal streams, and then each coded signal stream is transmitted using a respective transmitting and receiving unit (TXRU) equipped with a multi-antenna array, in which an antenna array weight used by the respective TXRU to transmit each coded signal stream is one of two sets of antenna array weights, and at least two TXRUs use two different sets of antenna array weights. The present disclosure also discloses a corresponding transmitter. With the present disclosure, transmitting diversity may be realized in a large-scale antenna system.

10 Claims, 10 Drawing Sheets

(56) References Cited

U.S. PATENT DOCUMENTS

| | | | |
|---|---|---|---|
| 2011/0317582 A1 | 12/2011 | Han et al. | |
| 2013/0244594 A1* | 9/2013 | Alrabadi | H04B 7/0413 455/78 |
| 2014/0133435 A1 | 5/2014 | Forenza et al. | |
| 2014/0334564 A1* | 11/2014 | Singh | H04B 7/0413 375/267 |
| 2015/0163683 A1 | 6/2015 | Namgoong et al. | |
| 2017/0026844 A1* | 1/2017 | Baldemair | H04B 7/0465 |
| 2017/0303136 A1* | 10/2017 | Park | H04W 16/14 |

OTHER PUBLICATIONS

Sony, "Lower Complexity Antenna Diversity for MTC Devices," R1-153084, 3GPP TSG RAN WG1 Meeting #80bis, Fukuoka, Japan, May 25-29, 2015, May 16, 2015, 7 pages.

\* cited by examiner

METHOD AND APPARATUS FOR TRANSMITTING DIVERSITY

CROSS-REFERENCE TO RELATED APPLICATION(S) AND CLAIM OF PRIORITY

The present application is related to and claims the benefit under 35 U.S.C. § 119(a) of a Chinese patent application filed on Aug. 21, 2015 in the State Intellectual Property Office of the People's Republic of China (P.R.C) and assigned Application Number 201510518648.2, and a Chinese patent application filed on Jan. 25, 2016 in the State Intellectual Property Office of the P.R.C and assigned Application Number 201610048551.4, the entire disclosures of which are hereby incorporated by reference.

TECHNICAL FIELD

The present disclosure relates to wireless communication technologies, and especially to a method and an apparatus for transmitting diversity in a multi-antenna system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Multiple-input-multiple-output technology (abbreviated as MIMO, and also referred to as multi-antenna technology) may exponentially increase spectral efficiency of a wireless communication system by utilizing spatial resources, and therefore has become an important technology of cellular communications. There are many ways of utilizing the multi-antenna technology, among which transmitting diversity is an effective means of using space-time coding to enhance link reliability. Traditional Alamouti code may realize a way of transmitting diversity with Rate=1 in a situation where two antennas are used. Long term evolution (LTE) systems corresponding to an evolved universal terrestrial radio access (E-UTRA) protocol proposed by the third generation partnership project (3GPP) define various ways of transmitting diversity.

A large-scale antenna array (large-scale MIMO, or massive MIMO) system is a main candidate technique of the 5th Generation (5G) cellular communication standards. Large-scale antennas enable a system to use a great number of degrees of freedom of signal processing to dramatically decrease interference among user equipments and interference among cells, and calculation therein is not complex, which may effectively improve the quality of communication links. In addition, the large-scale antennas may effectively reduce power consumption of a single antenna unit, and improve energy efficiency of the overall system. Existing experiments have testified possibility of configuring tens or even hundreds of antennas for a base station. An implementation of large-scale antennas in a millimeter wave band may be that a base station configured with a large-scale antenna array uses phase difference among antennas to form extremely narrow transmitting beams to serve a plurality of user equipments when a distance between the antennas is very small; meanwhile, a user equipment may also be configured with multiple antennas to form different gains for different directions of arrival, and may select a receiving beam with a relatively large gain to receive data. If each transmitting beam of the base station serves one user equipment, then interference among the user equipments will be dramatically reduced; and if two neighboring base stations use transmitting waves in different directions to serve their respective user equipments, then interference among the cells will be dramatically reduced. A theoretic analysis result shows that in a large-scale antenna system, if a transmitter knows accurate channel distribution information (CDI) of channels of a user equipment, then resulting signal-to-noise ratios (SNRs) of downlinks and uplinks may increase as the number of antennas increases; and for tens or even hundreds of transmitting antennas, corresponding system capacities thereof may be improved significantly.

Since it is hard to realize multiple antennas transmitting diversity when there are too many antennas, e.g., a lot of challenges to be encountered with when designing space-time code, currently, LTE systems only define transmitting diversity using four antennas for transmission diversity. Therefore, how to realize transmitting diversity in a large-scale antenna system is a field yet to be exploited.

SUMMARY

To address the above-discussed deficiencies, it is a primary object to provide a method and an apparatus for transmitting diversity, so as to realize transmitting diversity in a large-scale antenna system.

A method for transmitting diversity, implemented at a transmitting end, is provided according to the present disclosure, including performing space-time precoding for a digital signal to obtain at least two coded signal streams, and transmitting each coded signal stream using a respective transmitting and receiving unit (TXRU) equipped with a multi-antenna array, in which an antenna array weight used by the respective TXRU to transmit each coded signal stream is one of two sets of antenna array weights, and there are at least two TXRUs using two different sets of antenna array weights.

The two sets of antenna array weights may be respectively:

$$w1 = \left[1, e^{j2\pi \sin(\theta)d/\lambda}, \ldots \; e^{j2\pi\left(\frac{N}{2}-1\right)\sin(\theta)d/\lambda}, e^{j2\pi\left(\frac{N}{2}\right)\sin(\theta)d/\lambda} \ldots \; e^{j2\pi(N-1)\sin(\theta)d/\lambda}\right]^T$$

and $$w2 = \left[1, e^{j2\pi \sin(\theta)d/\lambda}, \ldots \; e^{j2\pi\left(\frac{N}{2}-1\right)\sin(\theta)d/\lambda}, -e^{j2\pi\left(\frac{N}{2}\right)\sin(\theta)d/\lambda} \ldots \; -e^{j2\pi(N-1)\sin(\theta)d/\lambda}\right]^T$$

where $\theta$ is a central direction of beamforming, d is a distance between antenna units, $\lambda$ is a wavelength, and N is the number of antenna units in a TXRU; w1 is a N-dimensional vector, and the $n^{th}$ element in w1 is represented as $$e^{j2\pi(n-1)\frac{d}{\lambda}\sin(\theta_{prob})},$$

where $1 \leq n \leq N$; and w2 is a N-dimensional vector, wherein first N/2 elements in w2 are the same with first N/2 elements in w1, and last N/2 elements of w2 are opposite numbers of last N/2 elements in w1.

The antenna array weight used by the respective TXRU to transmit each coded signal stream varies as time varies.

The number of coded signal streams transmitted using a same antenna array weight varies as time varies.

The space-time precoding includes a combination of one or more of space-time block coding (STBC), space-frequency block coding (SFBC), cyclic delay diversity (CDD), frequency switch transmit diversity (FSTD), and antenna switching.

A transmitter is provided according to the present disclosure, including: a coding module and a transmitting module, in which the coding module is to perform space-time precoding for a digital signal to obtain at least two coded signal streams; and the transmitting module includes a multi-antenna array and is to transmit each coded signal stream using a respective transmitting and receiving unit (TXRU) equipped with the multi-antenna array, in which an antenna array weight used by the respective TXRU to transmit each coded signal stream is one of two sets of antenna array weights, and there are at least two TXRUs using two different sets of antenna array weights.

The two sets of antenna array weights are respectively:

$$w1 = \left[1, e^{j2\pi \sin(\theta)d/\lambda}, \ldots \; e^{j2\pi\left(\frac{N}{2}-1\right)\sin(\theta)d/\lambda}, e^{j2\pi\left(\frac{N}{2}\right)\sin(\theta)d/\lambda} \ldots \; e^{j2\pi(N-1)\sin(\theta)d/\lambda}\right]^T$$

and $$w2 = \left[1, e^{j2\pi \sin(\theta)d/\lambda}, \ldots \; e^{j2\pi\left(\frac{N}{2}-1\right)\sin(\theta)d/\lambda}, -e^{j2\pi\left(\frac{N}{2}\right)\sin(\theta)d/\lambda} \ldots \; -e^{j2\pi(N-1)\sin(\theta)d/\lambda}\right]^T$$

where $\theta$ is a central direction of beamforming, d is a distance between antenna units, $\lambda$ is a wavelength, and N is the number of antenna units in a TXRU; w1 is a N-dimensional vector, and the $n^{th}$ element in w1 is represented as $$e^{j2\pi(n-1)\frac{d}{\lambda}\sin(\theta_{prob})},$$

where $1 \leq n \leq N$; and w2 is a N-dimensional vector, wherein first N/2 elements in w2 are the same with first N/2 elements in w1, and last N/2 elements in w2 are opposite numbers of last N/2 elements in w1.

The antenna array weight used by the respective TXRU to transmit each coded signal stream varies as time varies.

The number of coded signal streams transmitted using a same antenna array weight varies as time varies.

The space-time precoding includes a combination of one or more of space-time block coding (STBC), space-frequency block coding (SFBC), cyclic delay diversity (CDD), frequency switch transmit diversity (FSTD), and antenna switching.

As is seen from the forgoing, in the method and apparatus for transmitting diversity based on differential beamforming provided according to the present disclosure, a transmitting end performs space-time precoding for a digital signal to obtain at least two coded signal streams, and when transmitting each coded signal stream using a respective TXRU equipped with a multi-antenna array, uses one of two sets of antenna array weights, which guarantees that there are at least two TXRUs using two different sets of antenna array weights, so as to realize transmitting diversity in a large-scale antenna system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

To make the objects, technical schemes and advantages of the present disclosure clearer, the present disclosure will be described in detail hereinafter with reference to the accompanying drawings and embodiments.

The present disclosure provides a simple and effective solution of transmitting diversity based on the hybrid multi-antenna structure described in the Background. First, space-time precoding is performed for a digital signal to obtain at least two coded signal streams. Then, each of the coded signal streams is transmitted by a respective TXRU equipped with a multi-antenna array, in which an antenna array weight used by the respective TXRU to transmit each coded signal stream is one of two sets of antenna array weights, and there are at least two TXRUs using two different sets of antenna array weights.

Embodiment 1

In the large-scale antenna array system, using multiple analog antennas and digital antennas in combination has gradually become a popular solution. In this kind of structures, among multiple available paths, a part of them can be controlled by digital basebands, and their phases and amplitudes can be controlled freely. And others can be controlled by radio frequency devices, and only provide a way of transmission by beamforming based on phase difference of an antenna array.

Figure 1:
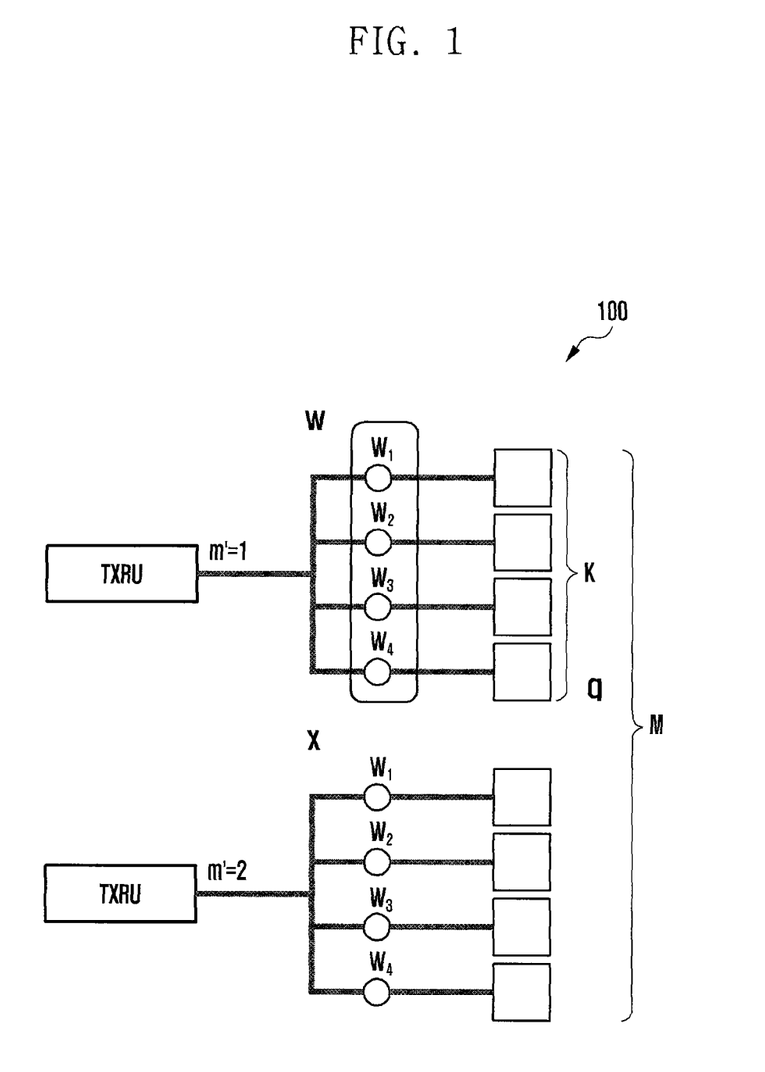
FIG. 1 is a schematic diagram of a multi-antenna system using a hybrid mode of digital antennas and analog antennas.

FIG. 1 is a schematic diagram 100 of a multi-antenna system using a hybrid mode of digital antennas and analog antennas. As is shown in FIG. 1, each transmitting and receiving unit (TXRU) is used to form one digital path, and there are two digital paths. Each digital path can be cascaded with four radio frequency paths. This hybrid structure can provide various combinations of antenna transmission modes, e.g., a transmission mode using a baseband path for spatial multiplexing, and meanwhile, can realize a way of transmission by beamforming using multiple analog paths.

In the present embodiment, an implementation of a multi-antenna system based on the structure shown in FIG. 1 is provided. In the system, two TXRUs are configured to provide baseband paths, and each of the TXRUs is cascaded with an antenna array consisting of 4 antenna units.

First, assume that modulated signals are $x_1$ and $x_2$, then by using the two TXRUs, simple Alamouti coding can be realized as:

$$\begin{bmatrix} y^1(0) & y^1(1) \\ y^2(0) & y^2(1) \end{bmatrix} = \begin{bmatrix} x_1 & x_2 \\ -x_2^* & x_1^* \end{bmatrix}$$

where "*" represents a conjugate operation, "−" represents an additive inverse operation, and $y^p(k)$ represents a $k^{th}$ symbol coded at a $p^{th}$ TXRU, i.e., $y^1(k)$ to be transmitted on TXRU #1, $y^2(k)$ to be transmitted on TXRU#2, and so on. Assuming that a weight used by an antenna array cascaded with TXRU#1 is $w1=[w^1(1),w^1(2),w^1(3),w^1(4)]^T$, then the weight as follows can be used to perform beamforming for TXRU#1:

$$w1=[1,e^{j2\pi \sin(\theta)d/\lambda},e^{j4\pi \sin(\theta)d/\lambda},e^{j6\pi \sin(\theta)d/\lambda}]^T$$

where, θ is a central direction of beamforming, d is a distance between antenna units, λ is a wavelength, and N is the number of antenna units in each TXRU. Meanwhile, assume that a weight of beamforming $w2=[w^2(1),w^2(2),w^2(3),w^2(4)]^T$ used for TXRU#2 is:

$$w2=[1,e^{j2\pi \sin(\theta)d/\lambda},-e^{j4\pi \sin(\theta)d/\lambda},-e^{j6\pi \sin(\theta)d/\lambda}]^T$$

Figure 2:
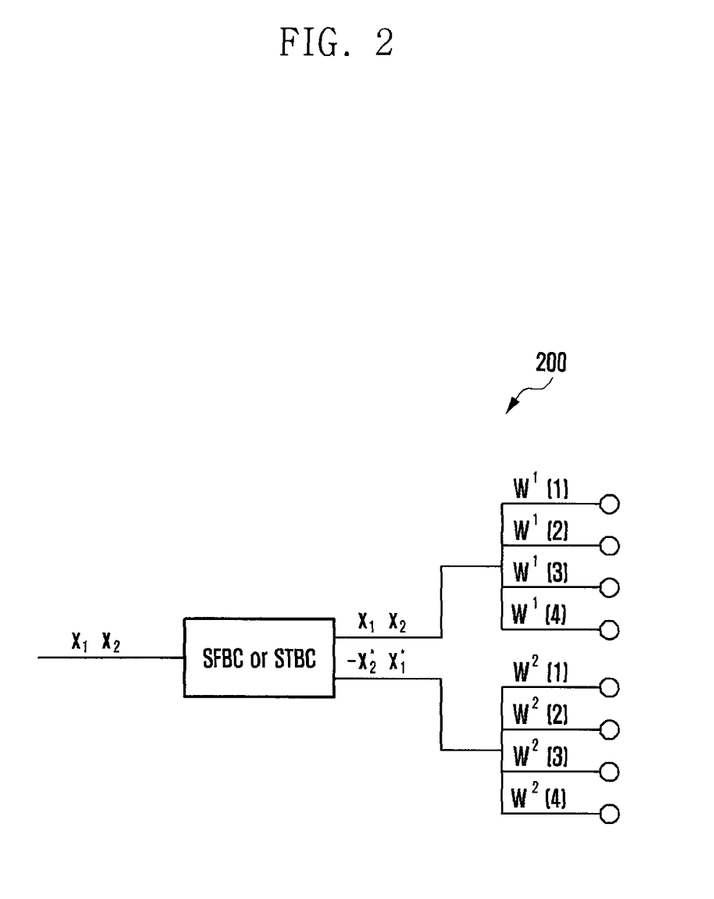
FIG. 2 is a schematic diagram of a flow of generating signals according to Embodiment 1 of the present disclosure.

FIG. 2 is a schematic diagram 200 of a flow of generating signals according to the foregoing method. Based on the foregoing method, gains in different directions obtained based on a two-way analog beamforming method can be as shown in FIG. 3.

Figure 3:
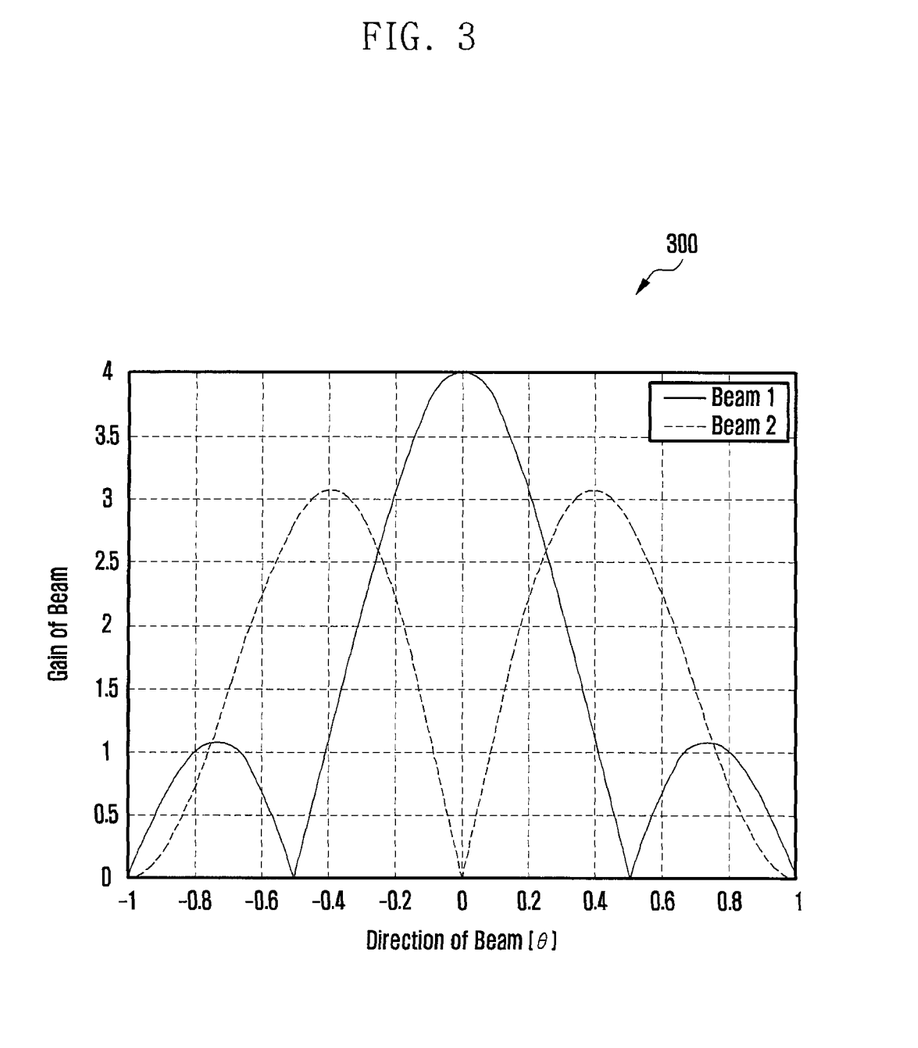
FIG. 3 is a schematic diagram of gains of beams generated according to a differential method of the present disclosure.

FIG. 3 is a schematic diagram 300 of gains of beams generated according to a differential method of the present disclosure. As is seen from FIG. 3, a gain of a beam 1 in a central direction is the strongest, and meanwhile, the gain of the beam 1 decreases rapidly when deviating from the central direction. In contrast, a gain of a beam 2 in a central direction is 0, and increases rapidly when deviating from the central direction. Thus, it can be seen that the two sets of weights generate differential beams. This means that when a receiving end is not located in a central direction of beamforming, the beam 2 can provide a better channel gain, so as to reduce possibility of the two signal streams encountering with deep fading at the same time. Normally in practice, a transmitting end tends not to ideally align a central direction of beamforming with a receiving end due to issues such as estimation errors, delay of feedback, and non-ideal calibration of antennas. Therefore, the proposed method provides beam pattern diversity based on space-time coding of the digital signals. This method can greatly enhance link reliability even if there are errors in beamforming.

It should be noted that the foregoing method is only an intuitive embodiment. The method can be expanded to digital space-time precoding of more paths. When the number of coded signal streams after space-time precoding is more than two, the coded signal streams can be grouped into multiple groups each of which has two coded signal streams, and beamforming can be performed for two coded signal streams in each group using weights w1 and w2 respectively. In this way, a respective antenna array weight used for each coded signal stream can vary as time varies. Or the coded signal streams may not be grouped, but beamforming can be performed for each coded signal stream using weights w1 and w2 randomly. In this way, the number of coded signal streams using a same antenna array weight can vary as time varies. In addition, for the differential weight w2, a part of diversity gains can be obtained using any combination of weights. However, in the present embodiment, the selected w2 can generate a beam having a direction totally opposite to that generated by w1, and thus the present embodiment is a good choice.

Embodiment 2

In the present embodiment, some detailed implementations of the system and performances in a simulation system are provided hereinafter.

Consider that a transmitter uses a large-scale multi-antenna system with a uniformly spaced linear array, in which the number of antennas is M=32, and a distance between antenna units is d=λ/2, i.e., using an antenna array having a distance of a half wavelength. In the system, data is transmitted in frames, and each frame comprises 14 modulated symbols. Similar to that in Embodiment 1, the diversity solution of differential beams provided according to the present disclosure can be combined with space-time block coding (STBC), i.e., the number of TXRUs being 2, and then the coded signals formed by the two TXRUs using Alamouti coding are:

$$\begin{bmatrix} y^1(0) & y^1(1) \\ y^2(0) & y^2(1) \end{bmatrix} = \begin{bmatrix} x_1 & x_2 \\ -x_2^* & x_1^* \end{bmatrix}$$

where $x_1$ and $x_2$ are adjacent quadrature phase shift keying (QPSK) modulated symbols, and $y^p(k)$ is a $k^{th}$ symbol on a $p^{th}$ TXRU. Data of each frame is divided into 7 blocks to perform Alamouti coding.

Each TXRU is connected with 16 transmitting antennas to perform beamforming. A beamforming weight of TXRU#1 is:

$$w1=[1,e^{j2\pi \sin(\theta)d/\lambda},e^{j4\pi \sin(\theta)d/\lambda},\ldots,e^{j30\pi \sin(\theta)d/\lambda}]^T$$

and a beamforming weight of TXRU#2 is:

$$w2=[1,e^{j2\pi \sin(\theta)d/\lambda},\ldots,e^{j14\pi \sin(\theta)d/\lambda},-e^{j16\pi \sin(\theta)d/\lambda}]^T$$

where θ is a central direction of a beam, and is decided by a user's location.

As a compared target, a transmit diversity solution of a traditional millimeter waveband communication system is considered, i.e., antennas connected with each TXRU using a same beamforming weight w1.

To estimate performances, the following narrow band multi-path channel model can be used:

$$h = \sum_{p=1}^{P} \rho_p a(\varphi_p) \in C^{1 \times M}$$

where P is the number of multiple paths, $\rho_p$ is a fading factor on a $p^{th}$ sub-path, and subjects to a zero mean complex Gaussian distribution, $\varphi_p$ is a direction of arrival (DOA) of the $p^{th}$ sub-path, and a vector $a(\varphi)$ can be expressed as:

$$a(\varphi)=[1,e^{-j2\pi \sin(\varphi)d/\lambda},e^{-j4\pi \sin(\varphi)d/\lambda},\ldots,e^{-j(M-1)2\pi \sin(\varphi)d/\lambda}]$$

First, a communication system working in a millimeter waveband is considered. Since reflection loss of a millimeter waveband is large, and a channel characteristic of the system working in the millimeter waveband is that a direct path occupies most of energy, and a reflection path has less energy, then only a single-path channel is considered, i.e., P=1. In this case, only a direct path is present. Assume that a user is located in a range of ±60° around a normal direction of the antenna array, and a direction of arrival thereof is φ. Due to non-ideal factors such as estimation errors, and feedback time delay, there can be a certain error between a direction of arrival estimated by the base station (i.e., a central direction of a beam of the base station) for the user, θ, and an actual direction of arrival φ, i.e., θ-φ subjecting to a uniform distribution on an interval [−Δθ,Δθ], and Δθ=9°.

Figure 4:
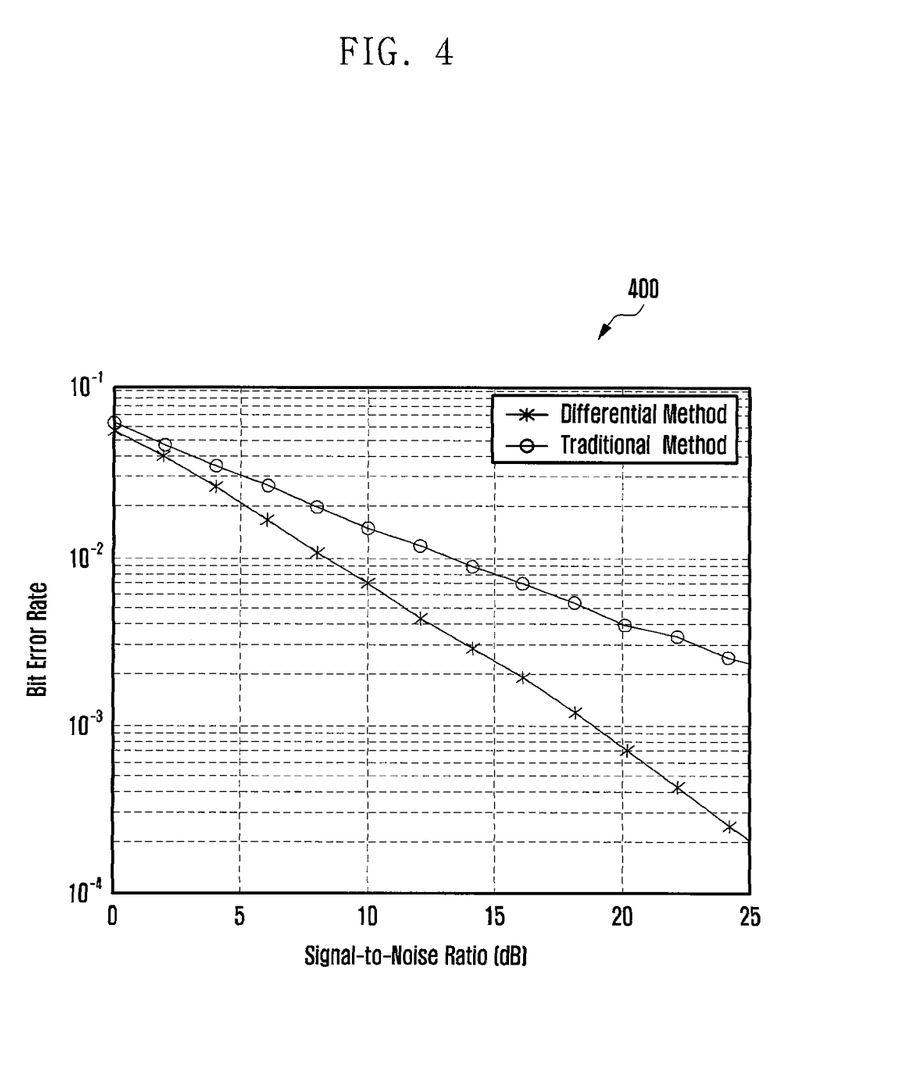
FIG. 4 is a schematic diagram of a comparison of bit error rates achieved based on the differential method of the present disclosure and a traditional method in a single path case.

FIG. 4 is a schematic diagram 400 of a comparison of bit error rates achieved based on the differential beamforming method of the present disclosure and a traditional method. As a signal-to-noise ratio rises, a decreasing rate of a bit error rate achieved based on the differential beamforming method is prominently faster than that achieved based on the traditional method. This is because that differential beamforming can effectively decrease the possibility of deep fading caused due to error deviation of beamforming directions, so as to obtain an extra diversity gain, and enhance link reliability.

Then, a multi-path situation where P=5 is considered. In this case, besides of a direct path having a DOA $\varphi_1$, there are still multiple paths caused by reflection. In this kind of channels, a direct path occupies most of energy, and the base station only estimates the DOA $\varphi_1$ of the direct path, and the largest estimation error is still $\Delta\theta=9°$. In addition, there is certain fading on the multiple paths caused by flection.

Figure 5:
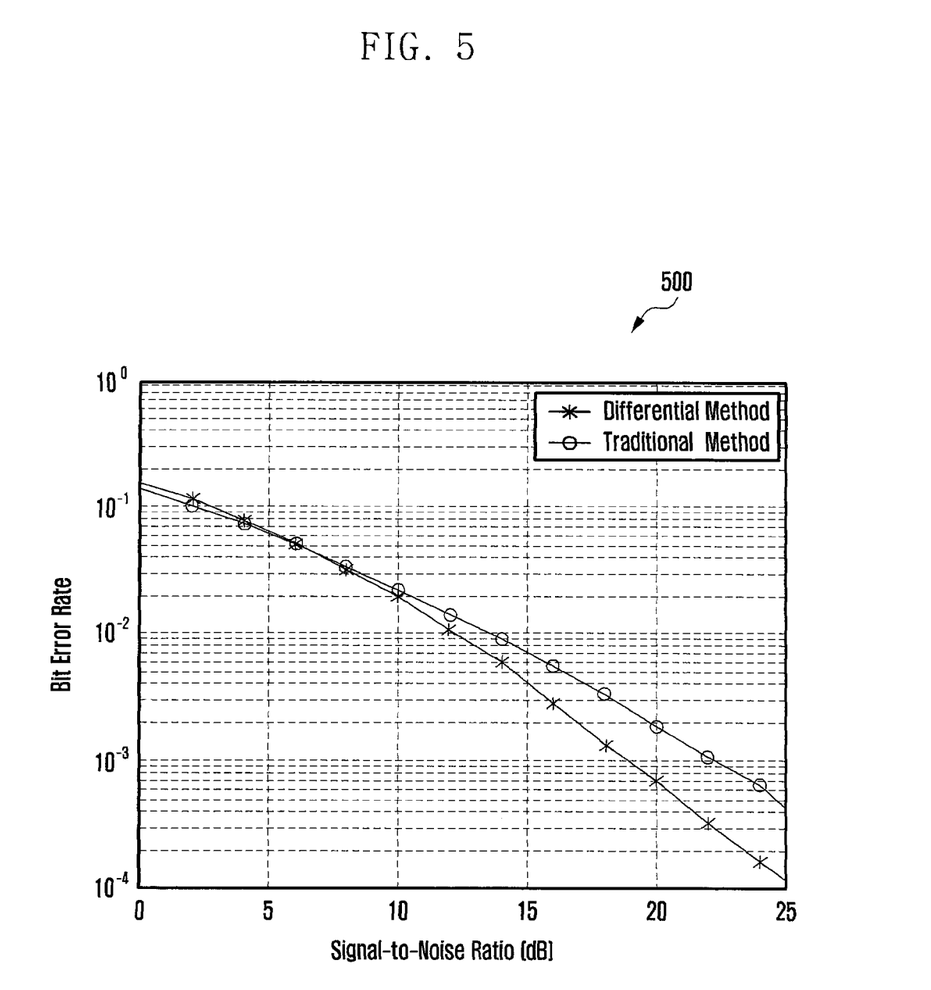
FIG. 5 is a schematic diagram of a comparison of bit error rates achieved based on the differential method of the present disclosure and the traditional method in the case of a multi-path fading value being 12 dB.
Figure 6:
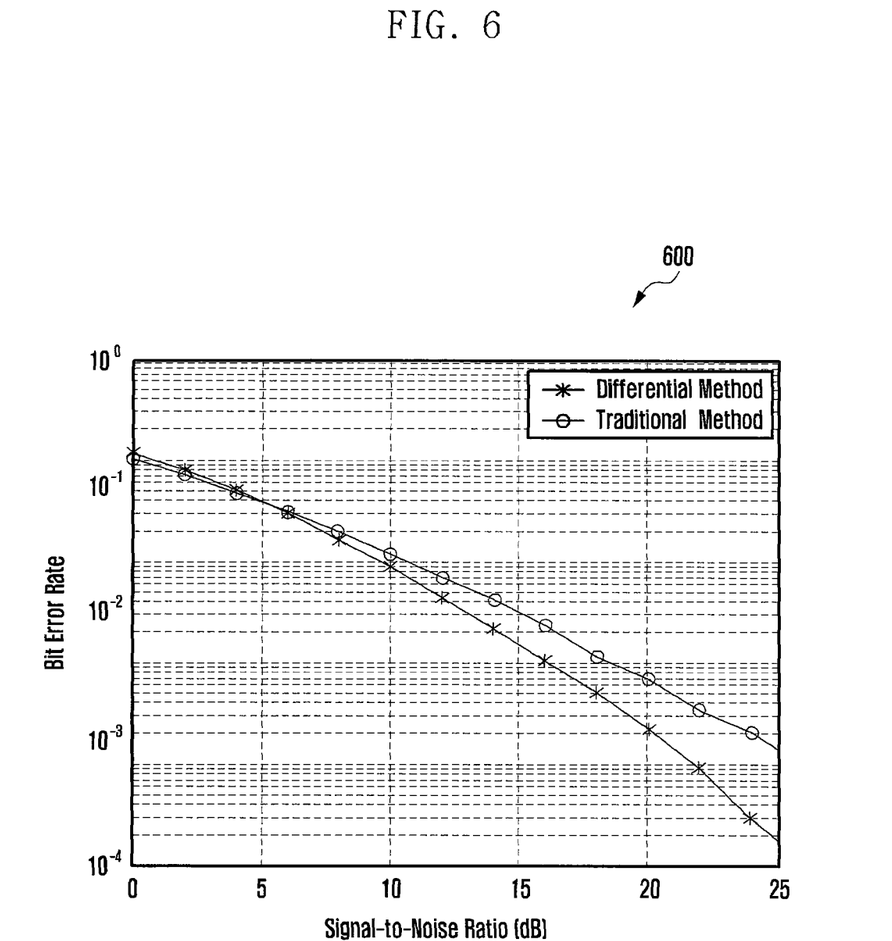
FIG. 6 is a schematic diagram of a comparison of bit error rates achieved based on the differential method of the present disclosure and the traditional method in the case of a multi-path fading value with 6 dB decaying.

FIG. 5 and FIG. 6 are schematic diagrams 500, 600 of comparisons of bit error rates achieved based on the differential method of the present disclosure and the traditional method in the case of the multi-path fading value being 12 dB and 6 dB, respectively. It can be seen that in the multi-path case, advantages of the differential beamforming-based diversity scheme are not that significant. However, compared to the traditional scheme, it still has a faster decreasing rate of bit error rate, which indicates that the method provided according to the present disclosure achieves a larger diversity gain, and has better reliability over a fading channel.

It is to be noted that, when the foregoing implementations of the system are slightly modified, they can be combined with one or more of space-time precoding methods such as space-frequency block coding (SFBC), cyclic delay diversity (CDD), frequency switch transmit diversity (FSTD), and antenna switching. For example, each physical resource block can consist of 12 subcarriers and 14 orthogonal frequency division multiplexing (OFDM) symbols, and respective two neighboring subcarriers can be coded using SFBC. That is, the 12 subcarriers are separated into 6 blocks to be coded using SFBC, then modulated using OFDM, and then transmitted on two TXRUs.

Embodiment 3

In the present embodiment, a diversity scheme which combines differential beamforming-based beam diversity and space-frequency block coding (SFBC) is provided.

Figure 7:
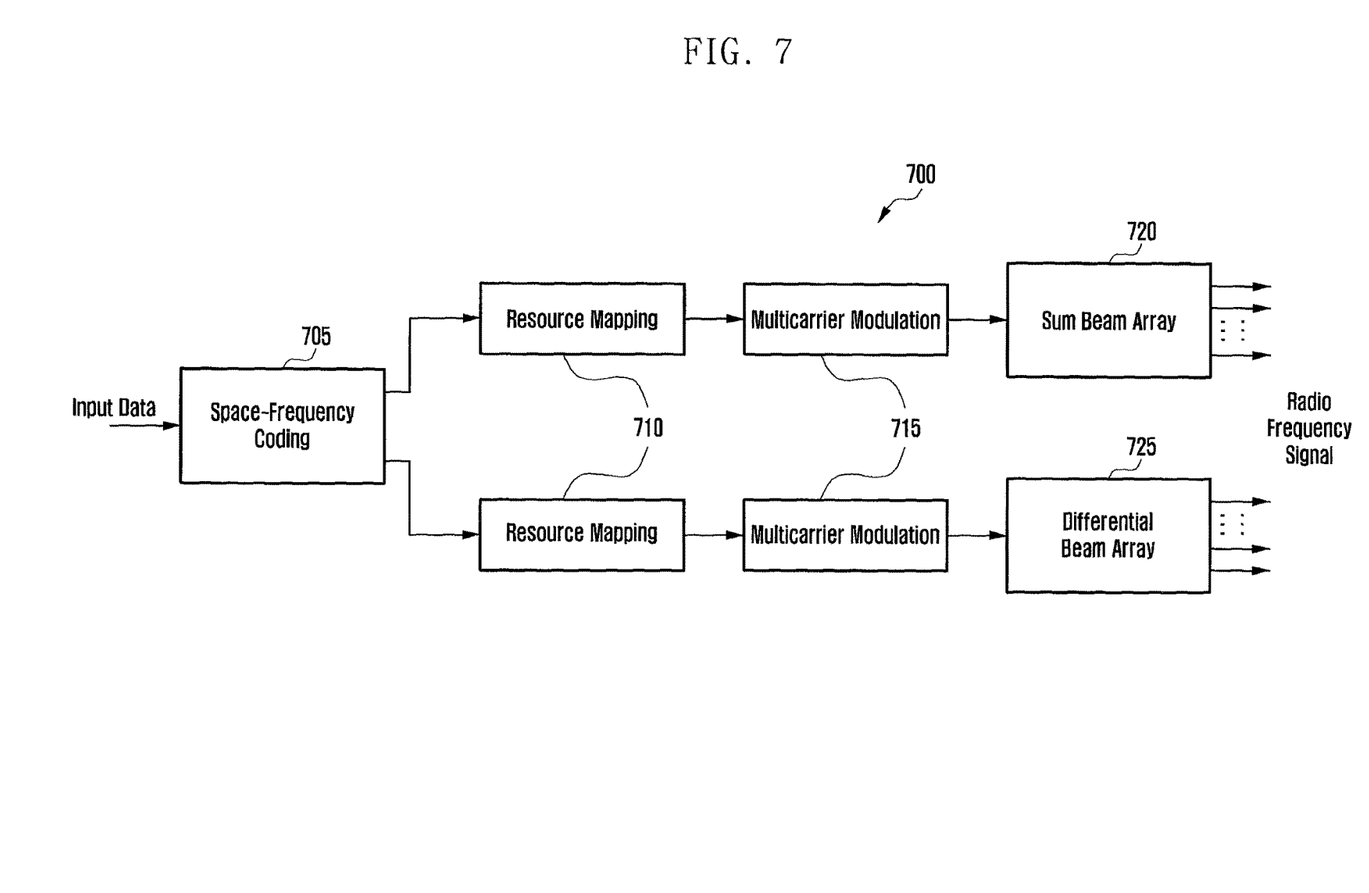
FIG. 7 is a schematic diagram of a signal generating flow in Embodiment 3 of the present disclosure.

A schematic diagram 700 of a signal generating flow in this embodiment is as shown in FIG. 7. A system schedules and transmits data using physical resource blocks (PRBs). Each PRB consists of 12 consecutive subcarriers on 14 OFDM symbols. Assume that a transmitting end uses a uniformly spaced linear array as an antenna array, and the transmitting end uses a hybrid structure of baseband/radio frequency as shown in FIG. 1.

Assuming that two adjacent symbols are [$x_1$ $x_2$], then the space-frequency block coding module 705 outputs two information streams in which a first information stream is [$x_1$ $-x^*_2$] and a second information stream is [$x_2$ $x^*_1$]. Then a resource mapping operation 710 is performed on the two information streams output from the space-frequency block coding module 705 to map the two information streams to time-frequency resources. Two symbols of each output stream after performing the space-frequency block coding operation on the two adjacent symbols are still mapped to adjacent subcarriers. Afterwards, a multi-carrier modulation operation 715, e.g., OFDM, is performed for each stream after the resource mapping operation, to obtain time-domain signal streams. Finally, different beamforming weight coefficients in different beam array 725 are used for the two time-domain signal streams, to obtain radio frequency signals to be transmitted. To be specific, one of the time-domain signal streams uses a beamforming weight coefficient vector as follows:

$$w1 = \left[1, e^{j2\pi\frac{d}{\lambda}sin(\theta)}, \ldots, e^{j2\pi(N-1)\frac{d}{\lambda}sin(\theta)}\right]^T,$$

and the other time-domain signal stream uses a beamforming weight coefficient vector as follows:

$$w2 = \left[1, e^{j2\pi\frac{d}{\lambda}sin(\theta)}, \ldots, e^{j2\pi\left(\frac{N}{2}-1\right)\frac{d}{\lambda}sin(\theta)}, -e^{j2\pi\left(\frac{N}{2}\right)\frac{d}{\lambda}sin(\theta)}, \ldots, -e^{j2\pi(N-1)\frac{d}{\lambda}sin(\theta)}\right]^T$$

where N is a dimension of each weight coefficient vector, i.e., the number of antenna array units that are needed for carrying out a beamforming operation for each signal stream; $d/\lambda$ is a signal wavelength-normalized antenna spacing; angle $\theta$ is an angle of departure (AOD), i.e., a transmitting angle. As is seen from the foregoing two expressions, the beamforming weight coefficient vector w1 used by the first signal stream is a N-dimensional vector, and the n^th element in the N-dimensional vector is $$e^{j2\pi(n-1)\frac{d}{\lambda}sin(\theta)},$$

where $1 \leq n \leq N\_$; the beamforming weight coefficient vector w2 used by the second signal stream is a N-dimensional vector, where the first N/2 elements in the N-dimensional vector are the same with the first N/2 elements of the beamforming weight coefficient used by the first signal stream are same, and the last N/2 elements in the N-dimensional vector are opposite numbers of the last N/2 elements of the beamforming weight coefficient used by the first signal stream. In the present embodiment, the beamforming weight coefficient vector used by the first signal stream is a sum beam, and the beamforming weight coefficient vector used by the second signal stream is a differential beam of the sum beam.

The transmitting end has knowledge of priori information of the transmitting angle. However, due to estimation error, channel variation, mobility of UE, and the like, there is a certain deviation between priori information and an actual orientation of the UE.

To estimate equivalent channel information of two links, reference signals need to be inserted for channel estimation. The reference signals are inserted after the space-frequency block encoding operation and before the multi-carrier modulation operation, and are configured to estimate an equivalent channel for each signal stream after going through beamforming at the transmitter end, a channel, and a radio frequency front end at the receiving end. Orthogonal pilot signals are inserted into the two signal streams, and the like, using orthogonal time-frequency resources to transmit the reference signals, or using orthogonal sequences as the reference signals on a same time-frequency resource.

In the present embodiment, the beamforming weight coefficient used by the first signal stream is a sum beam weight coefficient in sum beam array 720, and the beamforming weight coefficient used by the second signal stream is a differential beam weight coefficient of the sum beam in differential beam array 725.

Figure 8:
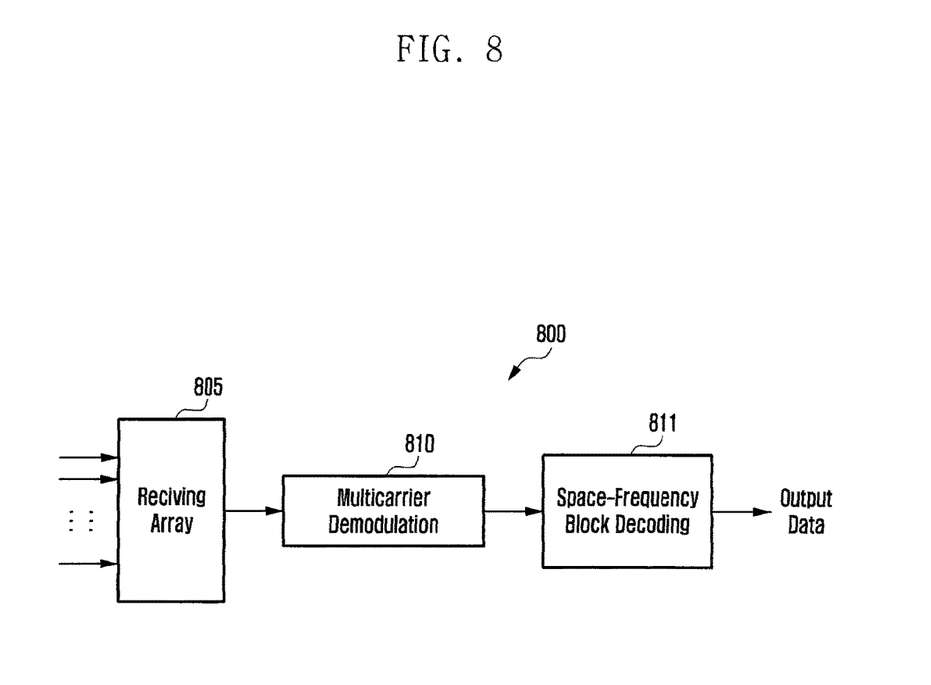
FIG. 8 is a schematic diagram of a signal receiving flow in Embodiment 3 of the present disclosure.

FIG. 8 is a schematic diagram 800 of a signal receiving flow in a differential beamforming diversity scheme which combines SFBC. The receiving end 805 performs channel estimation for the two links based on the reference signals, to decode space-frequency blocks. After the receiving end receives a signal, it first performs a carrier demodulation operation 810 for the received signal, then performs a space-frequency block decoding operation 815 to obtain output data, and then carries out a subsequent channel demodulation step. The system of the receiving end shown in FIG. 8 has a similar structure as that of a traditional system using SFBC, which indicates that the scheme provided according to the present embodiment is transparent to the receiving end, and has relatively small influence on the receiving end.

Compared with a traditional diversity scheme where two arrays use beams in a same direction, since the differential beamforming scheme is able to cover a larger angle, the scheme provided according to the present embodiment provide better protection in a beam direction estimation deviation aspect.

Embodiment 4

Figure 9:
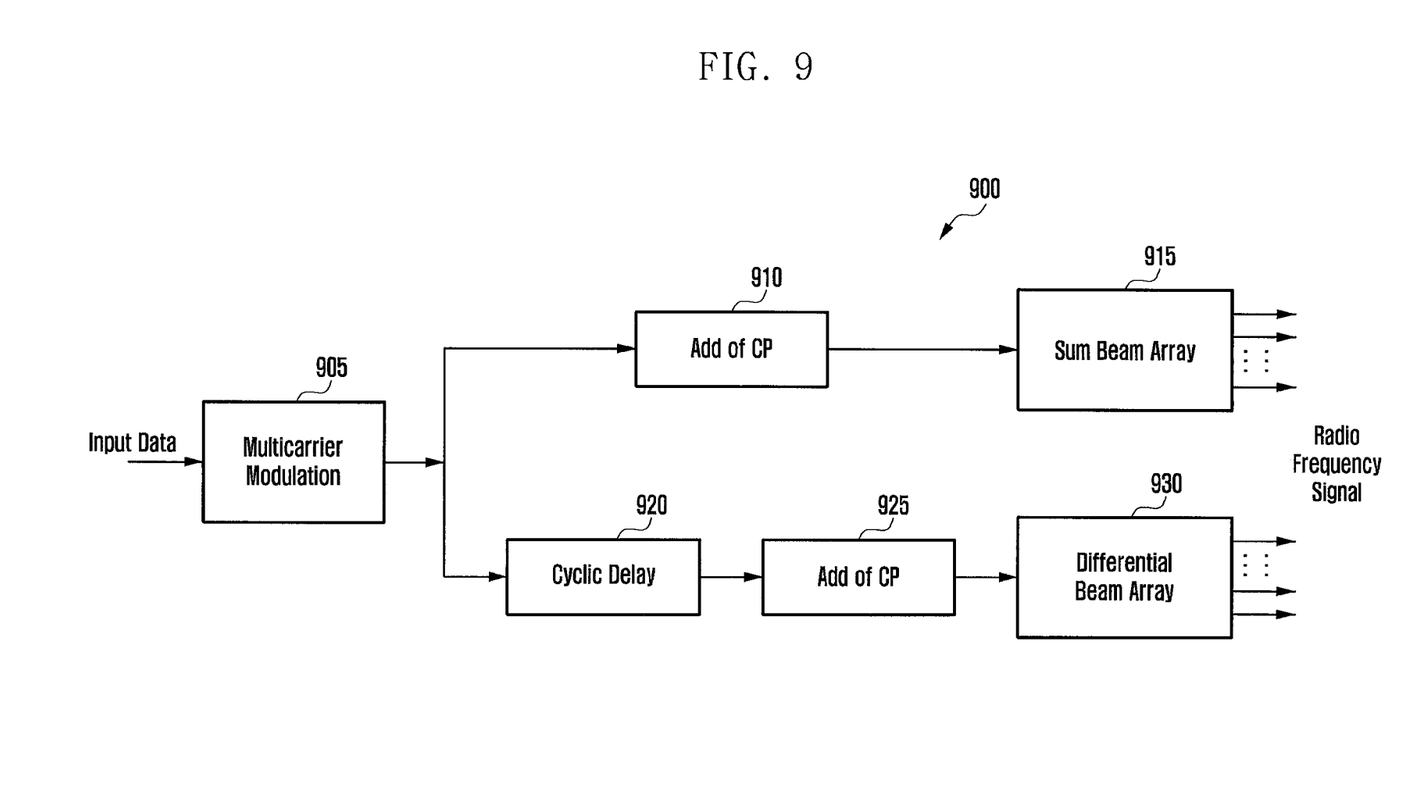
FIG. 9 is a schematic diagram of a signal generating flow in Embodiment 4 of the present disclosure.

In the present embodiment, a scheme of combining differential beamforming-based beam diversity and cyclic delay diversity (CDD) is provided. A scheme diagram 900 of a signal transmitting flow of the present embodiment is shown in FIG. 9. Assume that CDD generates two links in which a first link is an original link without cyclic delay being performed, and a second link is a link with cyclic delay being performed. The system schedules and transmits data through physical resource blocks (PRBs) in which each PRB consists of consecutive 12 subcarriers on 14 OFDM symbols. Assume that a transmitting end uses a uniformly spaced linear array as an antenna array.

As shown in FIG. 9, an input signal is a symbol stream after coding and constellation modulation operations, and the symbol stream is divided into two links after a multi-carrier modulation operation 905. A signal on the first link is added 910 with a cyclic prefix (CP), and then a beamforming operation is performed to obtain a radio frequency signal. A cyclic shift operation is first performed for the signal on the second link, and then the signal on the second link is added 925 with a CP and performs a beamforming operation to obtain a radio frequency signal to be transmitted on the second link. It is to be specified that this way to generate cyclic delay 920 through performing a cyclic shift operation on a time-domain signal is equivalent to multiplying each frequency-domain subcarrier by a phase factor, i.e., a phase factor multiplied by a subcarrier k is $e^{j\phi k}$, where $\phi=2\pi d_{cdd}/N_{FFT}$, and $N_{FFT}$ is the number of fast Fourier transform (FFT) points, and $d_{cdd}$ is an amount of time-domain equivalent cyclic shift. The method of multiplying a phase shift factor in a frequency domain needs to separate a frequency-domain signal into two same streams before performing a multi-carrier modulation operation on it. On a first link, a multi-carrier modulation operation and a beamforming operation are performed directly, and on a second link, a phase shift factor is multiplied, and then a multi-carrier modulation operation and a beamforming operation are performed. Processing in time domain and processing in frequency domain are equivalent.

The first link uses a beamforming weight coefficient as follows:

$$w1 = \left[1, e^{j2\pi \frac{d}{\lambda}\sin(\theta)}, \ldots, e^{j2\pi(N-1)\frac{d}{\lambda}\sin(\theta)}\right]^T,$$

and the second link uses a beamforming weight coefficient as follows:

$$w2 = \left[1, e^{j2\pi\frac{d}{\lambda}\sin(\theta)}, \ldots, e^{j2\pi\left(\frac{N}{2}-1\right)\frac{d}{\lambda}\sin(\theta)}, -e^{j2\pi\left(\frac{N}{2}\right)\frac{d}{\lambda}\sin(\theta)}, \ldots, -e^{j2\pi(N-1)\frac{d}{\lambda}\sin(\theta)}\right]^T,$$

where N is a dimension of each weight coefficient vector, i.e., the number of antenna array units that are needed for carrying out a beamforming operation for each signal stream; d/λ is a distance between antenna units with signal wavelengths being normalized; angle θ is a direction in which a beam leaves the antenna array, i.e., a transmitting angle. That is, the beamforming weight coefficient w1 used by the first signal stream is a N-dimensional vector, and the $n^{th}$ element in the N-dimensional vector is $$e^{j2\pi(n-1)\frac{d}{\lambda}\sin(\theta)},$$

where 1≤n≤N; the beamforming weight coefficient w2 used by the second signal stream is a N-dimensional vector, where the first N/2 elements in the N-dimensional vector w2 are the same with the first N/2 elements in the beamforming weight coefficient w1 used by the first signal stream are same, and the last N/2 elements in the N-dimensional vector w2 are opposite numbers of the last N/2 elements in the beamforming weight coefficient w1 used by the first signal stream. In the present embodiment, the beamforming weight coefficient used by the first signal stream is a sum beam weight coefficient in sum beam array 915, and the beamforming weight coefficient used by the second signal stream is a differential beam weight coefficient of the sum beam in differential beam array 930.

To facilitate the receiving end to perform channel estimation for an equivalent channel, the transmitting end needs to insert reference signals. For a differential beamforming-based beam diversity scheme, a reference signal is inserted before a signal is processed, and is processed in a same way as that for a data signal, used for estimating an equivalent information coefficient after going through cyclic delay processing at the transmitting, an actual physical channel, a front end of the receiving end.

The receiving end estimates an equivalent channel according to a reference signal, and uses an estimation result to demodulate data. First a multi-carrier demodulation operation is performed for a received data stream, then an equalization operation of a single tap is performed combined with a channel estimation result, and then constellation mapping demodulation and channel decoding operations are performed, to obtain an estimation of a transmitted bit stream.

In a CDD scheme combined with beamforming, beams of different directions are used for different links. However, in the present embodiment, the two links use a sum beam and a differential beam in a same direction, which, compared with the traditional scheme of using beams in different directions, is able to better protect beam estimation deviation, and provide a higher degree of space diversity.

It is to be specified that, the differential beamforming-based beam diversity scheme not only can be combined with a single space-time coding technique, but also can be combined with multiple space-time coding techniques, for example, first combining SFBC and FSTD, and then combining the differential beamforming-based beam diversity scheme.

Figure 10:
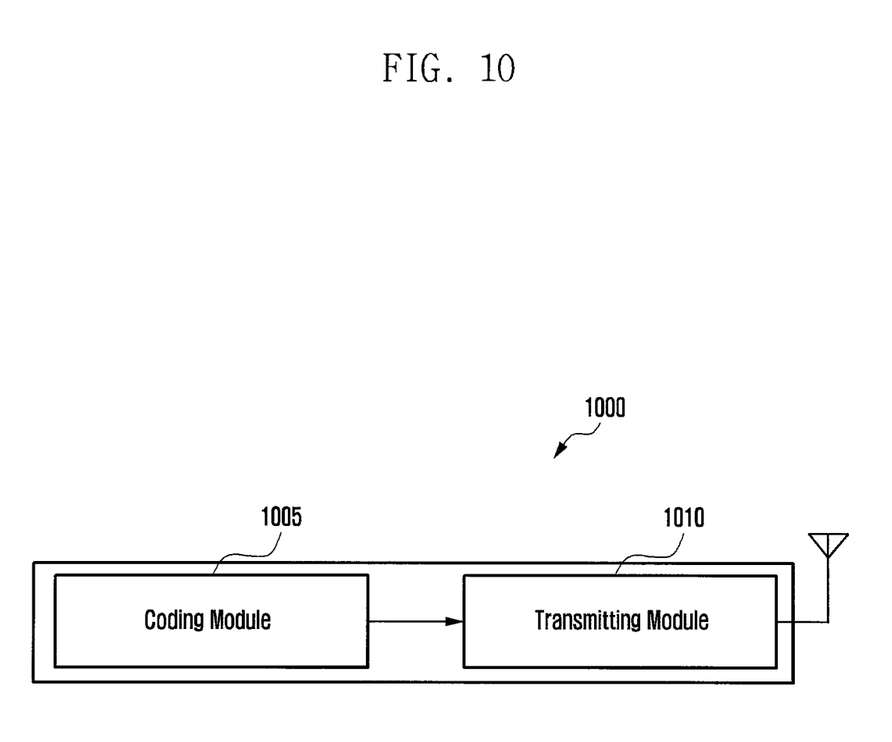
FIG. 10 is a schematic diagram of a structure of a transmitter according to the present disclosure.

Corresponding to the foregoing method, the present disclosure further provides a transmitter. FIG. 10 shows a structure of the transmitter 1000 which includes a coding module 1005 and a transmitting module 1010.

The coding module 1005 (i.e., coder) is to perform space-time precoding for a digital signal to obtain at least two coded signal streams.

The transmitting module 1010 (i.e., transmitter) includes a multi-antenna array, and is to use TXRUs equipped with the multi-antenna array to transmit the coded signal streams, in which an antenna array weight used by a respective TXRU to transmit a coded signal stream is one of two sets of weights, and there are at least two TXRUs using different sets of weights.

The two sets of weights can be respectively:

$$w1 = \left[1, e^{j2\pi sin(\theta)d/\lambda}, \ldots e^{j2\pi\left(\frac{N}{2}-1\right)sin(\theta)d/\lambda}, e^{j2\pi\left(\frac{N}{2}\right)sin(\theta)d/\lambda} \ldots e^{j2\pi(N-1)sin(\theta)d/\lambda}\right]^T$$

and $$w2 = \left[1, e^{j2\pi sin(\theta)d/\lambda}, \ldots e^{j2\pi\left(\frac{N}{2}-1\right)sin(\theta)d/\lambda}, -e^{j2\pi\left(\frac{N}{2}\right)sin(\theta)d/\lambda} \ldots -e^{j2\pi(N-1)sin(\theta)d/\lambda}\right]^T$$

where θ is a central direction of beamforming, d is a distance between antenna units, λ is a wavelength, and N is the number of antenna units in each TXRU; the beamforming weight coefficient w1 used by a first probing signal is a N-dimensional vector, and the $n^{th}$ element in the N-dimensional vector is $$e^{j2\pi(n-1)\frac{d}{\lambda}sin(\theta_{prob})},$$

where 1≤n≤N; the beamforming weight coefficient w2 used by a second probing signal is a N-dimensional vector, where the first N/2 elements in the N-dimensional vector w2 are the same with the first N/2 elements in the beamforming weight coefficient w1 used by the first probing signal are same, and the last N/2 elements in the N-dimensional vector w2 are opposite numbers of the last N/2 elements in the beamforming weight coefficient w1 used by the first probing signal.

The antenna array weight used by each TXRU to transmit each coded signal stream can vary as time varies.

The number of coded signal streams transmitted using a same antenna array weight can vary as time varies.

The space-time precoding can include a combination of one or more of STBC, SFBC, CDD, FSTD, and antenna switching.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting diversity by a transmitting node, the method comprising:
  performing a space-time precoding for a digital signal to obtain at least two coded signal streams; and
  transmitting each coded signal stream, which is obtained by the space-time precoding, by using a respective transmitting and receiving unit (TXRU) equipped with a multi-antenna array,
  wherein a multi-antenna array is controlled independently from another multi-antenna array by a TXRU associated with the multi-antenna array,
  wherein each of the respective TXRU performs a beamforming to transmit each coded signal stream,
  wherein an antenna array weight used by the respective TXRU to transmit each coded signal stream is one of two sets of antenna array weights, and at least two TXRUs use two different sets of antenna array weights,
  wherein each element of the antenna array weights is determined based on a number of antenna units associated with the respective TXRU, and
  wherein a number of coded signal streams transmitted using a same antenna array weight varies as time varies.

2. The method of claim 1, wherein the two sets of antenna array weights have a differential relation where a first half part of a second set of antenna array weights are the same with a first half part of a first set of antenna array weights, and a last half part of the second set of antenna array weights are opposite numbers of a last half part of the first set of antenna array weights.

3. The method of claim 1, wherein the two sets of antenna array weights are respectively:

$$w1 = \left[1, e^{j2\pi sin(\theta)d/\lambda}, \ldots e^{j2\pi\left(\frac{N}{2}-1\right)sin(\theta)d/\lambda}, e^{j2\pi\left(\frac{N}{2}\right)sin(\theta)d/\lambda} \ldots e^{j2\pi(N-1)sin(\theta)d/\lambda}\right]^T$$

and $$w2 = \left[1, e^{j2\pi sin(\theta)d/\lambda}, \ldots e^{j2\pi\left(\frac{N}{2}-1\right)sin(\theta)d/\lambda}, -e^{j2\pi\left(\frac{N}{2}\right)sin(\theta)d/\lambda} \ldots -e^{j2\pi(N-1)sin(\theta)d/\lambda}\right]^T$$

where θ is a central direction of a beamforming, d is a distance between antenna units, λ is a wavelength, N is the number of antenna units associated with the respective TXRU; w1 is a N-dimensional vector, and the $n^{th}$ element in w1 is represented as $$e^{j2\pi(n-1)\frac{d}{\lambda}\sin(\theta_{prob})},$$

where $1 \leq n \leq N$; and w2 is a N-dimensional vector, wherein first N/2 elements in w2 are the same with first N/2 elements in w1, and last N/2 elements in w2 are opposite numbers of last N/2 elements in w1.

4. The method of claim 1, wherein the antenna array weight used by the respective TXRU to transmit each coded signal stream varies as time varies.

5. The method of claim 1, wherein the space-time precoding comprises one or more of space-time block coding (STBC), space-frequency block coding (SFBC), cyclic delay diversity (CDD), frequency switch transmit diversity (FSTD), and antenna switching.

6. A transmitter, comprising:
a coder configured to perform a space-time precoding for a digital signal to obtain at least two coded signal streams; and
a transmitting module comprising a multi-antenna array, the transmitting module configured to transmit each coded signal stream, which is obtained by the space-time precoding, by using a respective transmitting and receiving unit (TXRU) equipped with the multi-antenna array,
wherein a multi-antenna array is controlled independently from another multi-antenna array by a TXRU associated with the multi-antenna array,
wherein each of the respective TXRU performs a beamforming to transmit each coded signal stream,
wherein an antenna array weight used by the respective TXRU to transmit each coded signal stream is one of two sets of antenna array weights, and at least two TXRUs use two different sets of antenna array weights,
wherein each element of the antenna array weight is determined based on a number of antenna units associated with the respective TXRU, and
wherein a number of coded signal streams transmitted using a same antenna array weight varies as time varies.

7. The transmitter of claim 6, wherein the two sets of antenna array weights have a differential relation where a first half part of a second set of antenna array weights are the same with a first half part of a first set of antenna array weights, and a last half part of the second set of antenna array weights are opposite numbers of a last half part of the first set of antenna array weights.

8. The transmitter of claim 6, wherein the two sets of antenna array weights are respectively:

$$w1 = \left[1, e^{j2\pi\sin(\theta)d/\lambda}, \ldots e^{j2\pi\left(\frac{N}{2}-1\right)\sin(\theta)d/\lambda}, e^{j2\pi\left(\frac{N}{2}\right)\sin(\theta)d/\lambda} \ldots e^{j2\pi(N-1)\sin(\theta)d/\lambda}\right]^T$$

and $$w2 = \left[1, e^{j2\pi\sin(\theta)d/\lambda}, \ldots e^{j2\pi\left(\frac{N}{2}-1\right)\sin(\theta)d/\lambda}, -e^{j2\pi\left(\frac{N}{2}\right)\sin(\theta)d/\lambda} \ldots -e^{j2\pi(N-1)\sin(\theta)d/\lambda}\right]^T$$

where θ is a central direction of a beamforming, d is a distance between antenna units, λ is a wavelength, and N is the number of antenna units associated with the respective TXRU; w1 is a N-dimensional vector, and the $n^{th}$ element in w1 is represented as $$e^{j2\pi(n-1)\frac{d}{\lambda}\sin(\theta_{prob})},$$

where $1 \leq n \leq N$; and w2 is a N-dimensional vector, wherein first N/2 elements in w2 are the same with first N/2 elements in w1, and last N/2 elements in w2 are opposite numbers of last N/2 elements in w1.

9. The transmitter of claim 6, wherein the antenna array weight used by the respective TXRU to transmit each coded signal stream varies as time varies.

10. The transmitter of claim 6, wherein the space-time precoding comprises one or more of space-time block coding (STBC), space-frequency block coding (SFBC), cyclic delay diversity (CDD), frequency switch transmit diversity (FSTD), and antenna switching.

* * * * *